Figure 1:
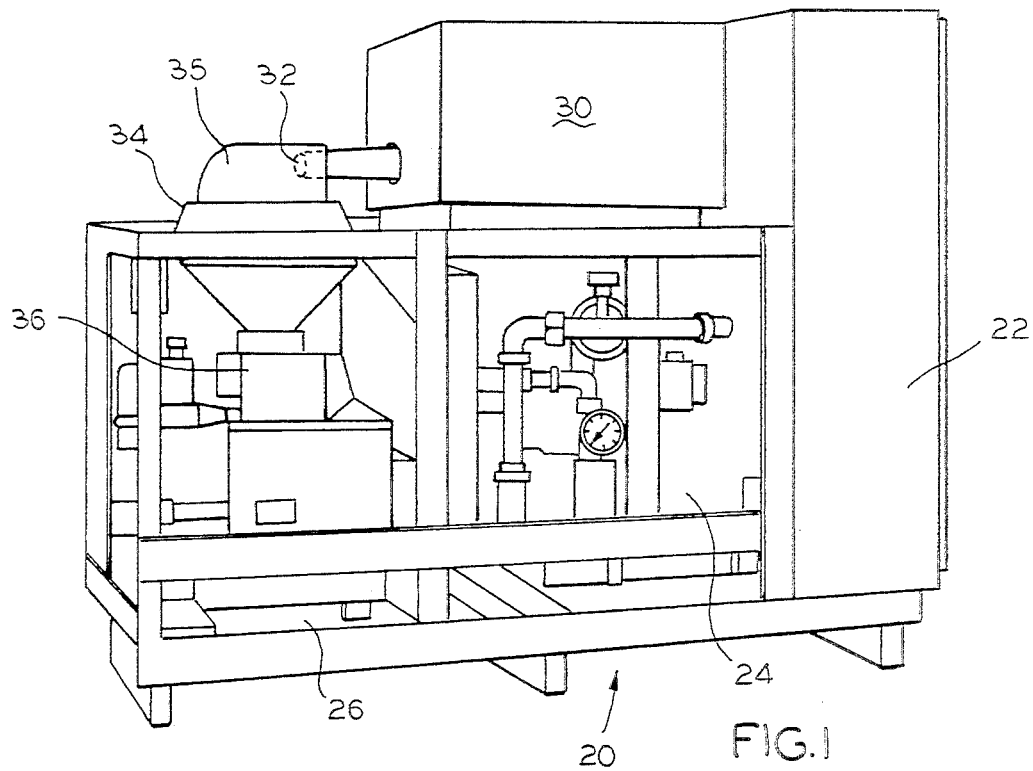

United States Patent [19]

Pardikes

[11] Patent Number: 5,407,975
[45] Date of Patent: Apr. 18, 1995

[54] DRY POLYMER AND ELECTROLYTE MIXING SYSTEM

[76] Inventor: Dennis G. Pardikes, 12811 S. 82nd Ct., Palos Park, Ill. 60464

[21] Appl. No.: 33,981

[22] Filed: Mar. 19, 1993

Related U.S. Application Data

[63] Continuation of Ser. No. 701,673, May 16, 1991, abandoned, which is a continuation-in-part of Ser. No. 589,312, Sep. 27, 1990, abandoned.

[51] Int. Cl.$^6$ .......................... C08L 1/00; C08K 3/00
[52] U.S. Cl. .................. 523/348; 523/322; 523/324; 528/499
[58] Field of Search ............ 528/499, 502; 523/322, 523/324, 348

[56] References Cited

U.S. PATENT DOCUMENTS

| | | | |
|---|---|---|---|
| 4,603,156 | 7/1986 | Sortwell | 523/324 |
| 4,688,945 | 8/1987 | Brazelton et al. | 366/156 |
| 4,908,676 | 3/1990 | Bedell et al. | 356/72 |

Primary Examiner—Paul R. Michl
Assistant Examiner—Patrick Niland
Attorney, Agent, or Firm—Laff, Whitesel, Conte & Saret, Ltd.

[57] ABSTRACT

The invention provides a system for thoroughly wetting a dry polymer and mixing it with water, or another electrolyte, to make an electrolyte/polymer mixture. The system uses a funnel which has water introduced along a circumferential pattern therein to form a wall of swirling water over the inner wall of the funnel. The dry polymer is dropped into the eye of the impeller vortex. The spout of the funnel opens directly into the vortex or eye of an impeller of a pump which imparts substantial energy to the mixture. After the dry polymer is thoroughly wetted by the impeller action, the mixture is transferred to a mixing vessel where a large volume of air is blown through the mixture at a relatively low pressure while the mixture ages. The viscosity of the mixture is enhanced by the conformationally structuring of the polymer at the water/air interface of the blown air. After processing in the mixing vessel, the polymer is withdrawn and used for any suitable purpose. It may be sent into a liquid polymer processing system which activates the polymer. Or, it may be sent into a storage container for subsequent shipment to another location.

13 Claims, 3 Drawing Sheets

DRY POLYMER AND ELECTROLYTE MIXING SYSTEM

This application is a continuation of application Ser. No. 07/701,673, filed May 16, 1991, now abandoned, which is a continuation-in-part of Ser. No. 07/589,312, filed Sep. 27, 1990, now abandoned.

This invention relates to mixing, diluting, dissolving, and activating dry water-soluble polymers in water or another electrolyte, and more particularly, to means for and methods of dispersing, conditioning, and transferring dry forms of water-soluble polymer into structured aqueous polymer solutions.

The term "activation" is widely used to describe a chemical transition of polymer to a usable form. Recently, terminology has tended to focus on how much activation has occurred with some arguing that there must be 100% activation before the word can be used. Since nothing is ever perfect, it is seen that if this arqument is carried to the extreme, very little polymer would ever be 100% activated. As used herein, no such fine level of distinction is made. The word "activated", in its many forms, is intended herein to encompass the start of the process and everything occurring thereinafter. Perhaps the word "inversion" might be more appropriate since it applies regardless of the degree of completion of the activating process.

Liquid or emulsion polymers are ion-charged organic molecules which are soluble in water or another electrolytic fluid, all of which fluids are hereinafter simply called "water".

All polymer starts out as a liquid but it may be put through a thermal drying process and into a dry product which is then chopped up into granules. These granules are hereinafter called "dry polymer particles".

The use of various synthetic and naturally occurring water-soluble polymers in a water treatment application is well known. Aqueous solutions containing dissolved synthetic organic polyelectrolytes (i.e., water soluble polymers) have been used for coagulating, flocculating, separating, retaining and thickening where electrostatically charged particles are suspended in water. Many useful polymer formulations and types have evolved which are characterized by unique chemical and physical properties.

From the many commercially available water-soluble polymers, some of the most common formulations or types come from the polyelectrolyte family of vinyl, acrylic and heterochain type polymers. The polyacrylamides and their vinyl addition derivatives include the water-soluble acrylamide-acrylic acids, acrylamide-acrylic salts or acrylates, maleic anhydrides, acrylonitriles, styrenes and other useful vinyl addition polymers. These water-soluble, synthetic organic polymers are described in detail in U.S. Pat. Nos. 3,418,237; 3,259,570; and 3,171,805; and are all supplied in the dry form.

Polyacrylamide-type polymers are also available in solution and water-in-oil emulsion forms, the later being described in detail in U.S. Pat. Nos. 3,284,393; 3,624,019; 3,826,771; 3,734,873, for example. The subsequent release of the water-soluble polymer from the water-in-oil emulsion by inversion is described in U.S. Pat. Nos. 3,807,701; 3,852,234; 4,057,223; 4,217,145; 4,522,502; 4,747,691, and many others.

Of the three forms of commercially available polymer (i.e., solution, emulsion, and dry), the dry polymer form is the most concentrated, cost effective, and difficult to solubilize into a useable aqueous solution product. It is extremely economical to ship polymer in a dry form. Also, a dry polymer is substantially a 100% active product. This means that every pound of dry polymer contains a pound of polymer charge, as opposed to a liquid system, where liquid could be anywhere from 30 to 50% active polymer, because the polymer is mixed in with a volume of oil.

The dry polymer becomes a very economical product to process and generally appeals to larger operations. To make dry polymer, most of the water is driven out of the original polymer solution until it is, maybe, up as much as 98% dry. Thus, there is a 2% or 3% moisture left in a dry polymer product. However, heretofore, the capital expenditure to process dry polymer back into a solution form has been almost three times more than the capital expenditure to process liquid polymer. The problems of handling dry polymer have been in fully wetting the polymer when dry polymer is returned to a solution form. Because it is completely dry, even after the particle surface is wet, the polymer has to react fully with water in order to become usable. Heretofore, it has taken about 30 minutes to an hour of mixing and aging, in order for a dry polymer to become a solution. Typically, polymer products that result from converting a dry polymer into a solution have been limited to about 1% of polymer by weight in the primary solution concentration. Some dry processes have claimed as high as 2 or 3% solution concentrations.

A number of methods and devices have been developed for preparing dry polymer into useable dissolved, lump-free solutions of polymer in water as detailed in U.S. Pat. Nos. 3,607,105; 4,529,794; and 4,688,945. More particularly, the closest known prior art is shown in U.S. Pat. No. 4,529,794 (Sortwell et al). This Sortwell et al patent points out many of the problems which are encountered when a dry polymer is dissolved in a liquid, prior to its activation. The Sortwell et al type of mechanism is very costly and difficult to maintain. Among other things, this mechanism attempts to reduce the size of the polymer particles by driving an impeller at extremely high speeds, reported in the patent to be 13,000 rpm. The use of a particle reduction unit reduces the granules in size to almost a powder which, when mixed with water, is almost instantly blended. This particle reduction affects the molecular weight of the polymer. This extremely high shear condition is thought to lead to a degradation caused by the heat which, in theory, is dissipated in the water.

These mixing and preparation methods and systems have a number of drawbacks including an insufficient wetting and dispersion of the dry polymer particles. Sometimes there is sticking and agglomerating of the particles into lumps and clumps which, once formed, are extremely difficult to reduce, dissolve or eliminate. The problems that result from handling high solids is not always getting the particles wetted. After the particles are wetted and start to hydrate, the polymer often goes immediately to an unusable state. In addition, some methods incorporate high-impact particle size reduction apparatus or high-shear mixers which tend to fracture polymer particles by subjecting them to excessive, high shear forces and thermal degradation.

There are two advantages in not taking a particle size reduction: 1) we are not shearing or reducing the molecular weight of the polymer and 2) we are not thermally degradating it. Heat builds up because there are close tolerances and the particles hit the blades, fracture, and release heat. If there is enough heat buildup in a dispersion unit to reduce particle size, particles break up into individual wetted gels. If the particles are not individually wetted big "fish eyes" are formed. These eyes are incompletely wetted polymer particles which have stuck together and become completely wetted on the outside, but are still dry powder on the inside.

Other prior art methods have been used, such as batch-type mixing, and diluting dry polymer with water in order to produce an aqueous polymer solution. These batch methods and apparatus require long mixing times in large mixing tanks and large storage tanks to hold substantial volumes of diluted water-soluble polymer. It is thought that none of the referenced prior methods or apparatus has been successful in producing high-solids concentrations of high-molecular-weight polyacrylamide-type polymer in a structured aqueous solution form from commercially available dry, water-soluble polymer, at a reasonable cost.

Accordingly, an object of the present invention is to provide new and improved means for and methods of conditioning dry water-soluble polymer by forming a structured aqueous polymer solution.

A further object of the invention is to provide apparatus which implements the conditioning of the dry water-soluble polymer in the formation of a structured aqueous polymer solution.

In keeping with an aspect of the invention, these and other objects are accomplished by a method for continuously mixing dry polymer with water. The mixture is dropped into the eye of a centrifugal pump impeller of a centrifugal dispersion unit operating at approximately 3000–6000 rpm. The wetted, dry polymer flows down into the dispersion unit at a fairly low rate, maybe five, six gallons a minute, for example. This pump is part of a variable speed disperser mechanism, generally adapted to run between 900 and 9000 rpm. The advantage is an instantaneous dispersion of the dry particles that drop and are mixed with water to the extent that the material goes into a kind of a pseudo-gel stage.

The water, which is introduced into the centrifugal dispersion unit, creates a solution which is hydraulically transferred under the force of the centrifugal pump and the educator motive water source into a mixing vessel where a low pressure, high volume of air is blended into the dispersion. Polymer hydration and aging occurs in the mixing vessel. Since the invention does not produce a particle size reduction, some additional aging time may be required, preferably within the mixing vessel.

After aging in the mixing vessel, there is a pneumatic transfer of the material from the mixing vessel into either storage or any suitable machine for processing the polymer, as may be required. One such processing machine is shown in my co-pending patent application Ser. No. 07/352,689 filed May 10, 1989, now abandoned and replaced by Ser. No. 07/540,910, filed Jun. 20, 1990, and entitled "System for Mixing and Activating Polymers".

A preferred embodiment of the invention is shown in the attached drawings wherein:

FIG. 1 is a pictorial representation of the inventive system;

FIG. 2 is a side elevation schematically showing the principal elements of the system of FIG. 1;

FIG. 3 Is a top plan view schematically showing a funnel used to supply dry polymer to a disperser;

FIG. 4 is a cross-sectional view taken along line 4—4 of FIG. 3;

FIG. 5 is a flow diagram showing how the system of FIGS. 1 and 2 operates; and FIG. 6 is a laboratory pilot line which was used to conduct tests using the inventive principles.

FIGS. 1 and 2 show a dry polymer processing system 20 mounted on a single frame. The major components of this system are a control panel 22, a liquid handling section 24, a dry polymer processing system 26, a source of dry polymer in the form of hopper 30, sensor 31, a dry polymer output port 32, a mixing container in the form of funnel 34, and a high speed disperser 36. The volumetric feeder at 30 is a standard commercial product. While the drawings show the output port 32 for the dry polymer as being open directly above the funnel 34, any suitable shroud 35 may be provided to prevent the dry polymers represented by arrows 56 in FIGS. 3 and 4 from being dispersed over any area other than the entrance to the funnel 34.

To assure that a source of dry polymer is flowing to the disperser 36, a non-contacting sensor 31 is located beneath the volumetric feeder spout 40 in order to "look" for an addition of dry polymer, at the appropriate time. The sensor 31 (FIG. 2) may be a photoelectric control, or a capacitance proximity sensor, or the like. The preferred embodiment is an infra red photo transmitter/receiver with a bifurcated fiber optic scanner (cable) set up for a retroreflective operation.

Simply put, a light beam may be projected through the target area (located just below the volumetric feed spout) to a suitable reflector and returned over a parallel path to the detector, thus enabling both the light transmitter and receiver to be located on the same side of the target area. The beam is interrupted by the cascading stream of dry polymer passing between the reflector and the transmitter-receiver. By monitoring the condition of the beam one can determine if polymer is flowing past the sensor and into the disperser 36 at the appropriate time.

As shown in FIG. 2, control panel 22 includes a microprocessor 40 and an AC frequency converter 38 which merely provides a suitable power source for some of the equipment used in the system. Primarily, it converts 60 hertz commercial power into a frequency which produces a desired pump speed. The control panel 22 supplies the power required by the microprocessor and associated equipment. The microprocessor 40 operates all of the equipment that is in the system by controlling the relays, the valves, the timing circuits, and the like, as required during the polymer processing.

The liquid handling system 24 may be the same as that shown in my above-identified co-pending patent application Ser. No. 07/540,910. This section 24 receives the solution of dry polymer mixed with water that is the output of section 26. Once the dry polymer is so mixed into a solution, it becomes substantially the same as most liquid polymer which may be introduced into my earlier or any other suitable activating system.

The dry processing section 26 includes a disperser 36 which has a variable speed centrifugal pump 42 capable of operating over a range of about 900–9000 rpm, and preferably at the preferred speeds of approximately 3,000 to 6,500 rpm. For some polymers, running at six to nine thousand rpm can increase the solids through put to get a dispersion pattern that is basically better than the through put of a standard centrifugal pump. The inventive system is able to provide polymer solutions that go up as high as four to six percent, for example. For most polymers, it is not desirable to go much above this speed since it might tend to grind and reduce the polymer particle size and to generate heat which causes the polymer to degradate.

Figures 2, 3:
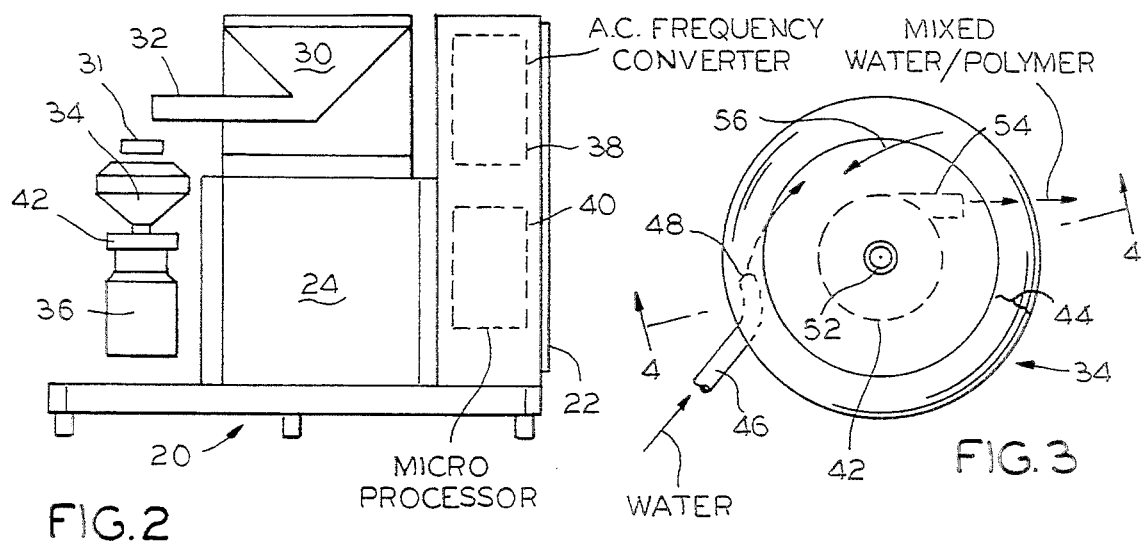
Figure 4:
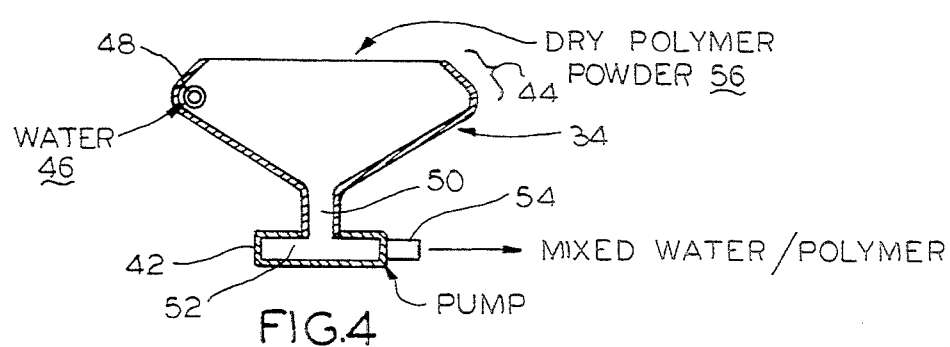

The construction of a mixing container or funnel feeder 34 is best shown in FIGS. 3 and 4. Basically, there is a funnel with a turned in upper lip 44. Water is feed in through a somewhat L-shaped pipe 46 having an exit end 48 which dispenses the water circumferentially into an equatorial bulge between the funnel 34 and the upper lip 44. The water swirls around the inside funnel wall and falls under gravity through the funnel spout 50 into the pump impeller. The funnel spout 50 opens directly into the eye or vortex 52 of a centrifugal pump 42.

One type of dry polymer particle flows under gravity from hopper 30 (FIG. 2) through output spout 32 and into an area where it mixes with the swirling water emerging from output port 48, as indicated by arrow 56 in FIGS. 3 and 4. The dry polymer falls into a sheet of fast moving water which wets the inside surface of funnel 36, thereby preventing the dry polymer from accumulating at any given point on the funnel wall. As the water swirls into the vortex 52 of centrifugal pump 42, it receives a large amount of energy which is imparted by the impeller blades. This energy mixes the water and polymer with a uniformity, which is discharged through the output port 54 of pump 42. At this point, the water and polymer mixture becomes approximately the same as a fluid form of polymer. Therefore, it may be further processed in any suitable system, such as the system of my earlier co-pending patent application Ser. No. 07/540,910 here shown as the block 24 of FIGS. 1 and 2.

Many dry polymers do not benefit from prewetting prior to becoming mechanically dispersed. These types of polymers often react to prewetting by forming "fisheyes" or agglomerated particles that are difficult to break up after they are once formed.

In these cases, the invention delivers the dry polymer directly into the center of the high speed disperser eye 52 of the centrifugal pump 42 without first having made contact with the water (arrow 56) flushing the side of the funnel wall. Once in the disperser 36, the dry solid particles are instantaneously wetted while simultaneously being accelerated through the disperser chamber.

In order to accomplish this, the disperser eye 52 of pump 42 is not completely immersed in water. The center portion of the spinning impeller element remains visible. That is, the water entering the disperser eye 52 from the funnel wall does not completely cover the impeller due to a combination of a controlled flow of water into the funnel and the centrifugal force imparted to the water by the disperser. Under these operating conditions, the disperser impeller does not become hydraulically locked. Consequently, the dry polymer has a direct pathway to the impeller due to the large amount of entrained air within the disperser 36 chamber.

The impeller disperser 36 has certain characteristics which are important to the invention. A first characteristic is the axial width, which is described as the width of the blades along the impellers axial dimension. If this width is too small, the impeller can become overloaded, severely reducing its ability to move the dry particles away from the impeller area. In some cases, clogging can occur.

Closely related to the axial width is the diameter of the impeller eye or inlet. If the inlet diameter is too small, bridging (i.e. the formation of a plug of dry particles over the inlet) of the dry polymer may occur at the inlet interface, thus limiting the rate at which dry polymer may be injected into the disperser. Additionally, a small eye diameter makes it difficult to maintain a clear pathway into the impeller without substantially prewetting the polymer first.

Therefore, a relationship between the impeller inlet diameter and axial width can be defined as the quotient of the equation:

$$\frac{\text{INLET DIAMETER}}{\text{AXIAL WIDTH}} = \frac{I\phi}{AW}$$

where $$\frac{I\phi}{AW}$$

should not be less than 2.0 to 2.5 and should not be greater than 7.0.

Another consideration is the impeller's overall diameter. As the diameter of the impeller increases, its tip speed increases proportionally. Thus, for example, if the diameter of the impeller is doubled, the tip speed is also doubled. When the tip speed is doubled, the energy imparted to the dry polymer and water mixture is substantially quadrupled.

Thus, one can anticipate that doubling (for example) the rotative speed of the impeller under hydraulic lock conditions may increase the horsepower requirements by a factor in the order of eight.

An intended purpose of the centrifugal disperser, however, may be to stay air bound so that the impeller loading does not make excessive horsepower demands. Even so, the overall diameter of the impeller has an impact on horsepower loading if the axial width is great enough. Therefore, the relationship between overall impeller diameter and axial width can be defined, as follows:

The quotient of the equation $$\frac{\text{OVERALL DIAMETER}}{\text{AXIAL WIDTH}} = \frac{O\phi}{AW}$$

where:

$$\frac{I\phi}{AW}$$

should not be less than 1.0 to 1.3 and should not be greater than 35.0. The preferred impeller may be a conventional design, employing a 4—7 bladed configuration. Some impellers have as many as 16 or so blades and some as little as 2. The impeller can be either an open or closed construction. Unlike the particle mill rotors employing 200 or so blades (with very small clearances, 0.0048 of an inch, for example) between the rotor and stator, the disperser impellers clearance is approximately 0.25" or greater from the casing wall. These larger clearances do not normally plug with the polymer and water mixture, thus making them much more reliable than the close tolerance designs.

The flow diagram of FIG. 5 illustrates how the system of FIGS. 1—4 operates.

Inlet water is fed into the system at inlet 60 where a sensor 62 sounds an alarm 64 if there is a low input water condition. A throttle valve 66 is set to allow a certain amount of the water into the system. A low water sensor 68 gives an alarm if the flow of water should fall below a critical level at this point.

A suitable valving system 70 divides the water flow into primary and secondary dilution streams, the primary dilution going through pressure regulator 72 and into the funnel 34 via pipe 46 (FIG. 4). Pressure regulator 72 maintains a uniform delivery of water at a specified pressure, despite any ebbs and surges which may have occurred upstream of this point. A suitable sensor 74 detects any low primary dilution water condition and sounds the low water alarm 64, if it should occur. Overflow line 82 is higher in the funnel 34 than the primary dilution water discharge port 48. If something should plug funnel 34, while the system is inputting water, instead of overflowing, the extra water flows through overflow line 82 and is captured by this eductor mechanism 78, as a safety factor. An eductor includes a venturi which creates a vacuum that pulls any overflow appearing in pipe 82 into the eductor for delivery to the outgoing hydraulic transfer line 80.

Additional secondary dilution water is introduced through the eductor 78 and the output branch 80 as the dispersed water. The total output for a 5 gpm system, for example, could be increased by the secondary dilution water to be as high as 125 gpm, so that the total output of the machine could be 130 gpm of polymer and water. For more information on primary-secondary dilution, see my co-pending patent application Ser. No. 07/540,910, filed Jun. 20, 1990.

When it is not acting as an overflow, the educator (venturi) 134 is continuously drawing air. The air sucked in by the venturi action is added to the air already entrained in the polymer and water mixture, as it leaves the disperser 36, thus further enhancing the special air/polymer interfacial relationship. In certain circumstances, a separate air source can be added to the disperser 36 mechanism to increase or provide a constant amount of air to the polymer water mixture.

The secondary stream 76 meets and mixes with the output from the output port 54 of the centrifugal pump 42. This means that the dry polymer mixing system 34, 36 may produce a solution with a much higher percentage of polymer (i.e., less water for the amount of polymer that is in the solution) and then be diluted with water from the secondary dilution stream to provide a greater output at the hydraulic transfer line 80. As a result, a much smaller dry polymer processing system 26 may perform the same work as a larger system performed heretofore. Normally, there should not be any overflow through line 82. If it should occur, the only affect is to transfer a more diluted stream through pipe 80 to a mixing vessel 84. There, a suitable sensor detects the level of polymer hydration and controls the mixing vessel 84 to further process the solution, if required.

The fluid issuing from the disperser 36 is transferred through hydraulic transfer pipe 80 to a mixing vessel number 84. Any suitable number of such mixing vessels 84 may be provided to accommodate systems having different capacities. In general, each mixing vessel is a duplicate of the other. Therefore, only one will be described here.

The mixture of the now wetted dry polymer and water is placed in mixing vessel 84 where it stands for a period of time. A blower 86 blows air through a suitable automatically controlled valve 88 and into vessel 84. The blower rapidly agitates the material in vessel 84 by using a low pressure and a high volume of air. The air bubbles up through air spargers located throughout the mixing vessel and further ages the now wetted dry polymer. This processing enhances the mixtures viscosity by conformationally structuring the polymer through the air/water interface. Generally, this air blending may take a half hour to an hour, depending upon the solids being used. If required, a supplemental slow speed propeller or turbine type mixer 85 (well known in the art) can be added to mixing vessel 84 to reduce the possibility of a "channelling" of air bubbles through the viscous polymer solution. A suitable sensor 90 detects any low air volume and sounds an alarm in response thereto.

A suitable sensor 91 is located in the mixing vessel to keep the microprocessor 40 informed as to the current solution activity. While any suitable sensor may be used, one is sold under the trademark "Viscoliner" which lists U.S. Pat. Nos. 3,710,614; 3,712,117; 3,762,429; 3,875,791; 4,488,427; 4,524,610; and 4,566,181.

Once the cycle is done, which is determined by the microprocessor 40 (FIG. 2) that is controlling the process, the system goes into the transfer mode. In the transfer mode, valve 93 closes and pressurize mixing vessel 84 with air from blower 86. The product is discharged through valve 94 either to a storage tank 98 for later processing or straight through valve 100 to a liquid polymer feed system. For example, there may be a batch mixing which is carried out when the viscosity of the material standing in the vessel 84 reaches a given level. Or, there may be a continuous processing carried out at a rate which maintains a predetermined viscosity in vessel 84.

Insofar as the dry polymer mixing system 26 is concerned, the dry polymer is thoroughly dissolved and the mixture is ready to be transferred to any suitable location for further processing. Therefore, a dashed line is shown leading from point 96 to any suitable storage vessel 98. This storage vessel merely represents any suitable equipment for making a future use of the dissolved polymer mixture. From 96, the system also shows a connection to an input valve 100 which is the entrance to the system shown in my co-pending patent application Ser. No. 07/540,910.

A blocking valve 102 may be opened so that a graduated transparent cylinder 104 may fill with the fluid flowing in from mixing vessel 84. Once the graduated cylinder is filled to a level selected by an inspection of a gage on the transparent tube, blocking valve 102 is operated in another manner and the time required for the withdrawn amount of polymer to leave cylinder 104 and reenter the system is an indication of the viscosity and, therefore, the quality of the product coming from the mixing vessel 84.

Figure 5:
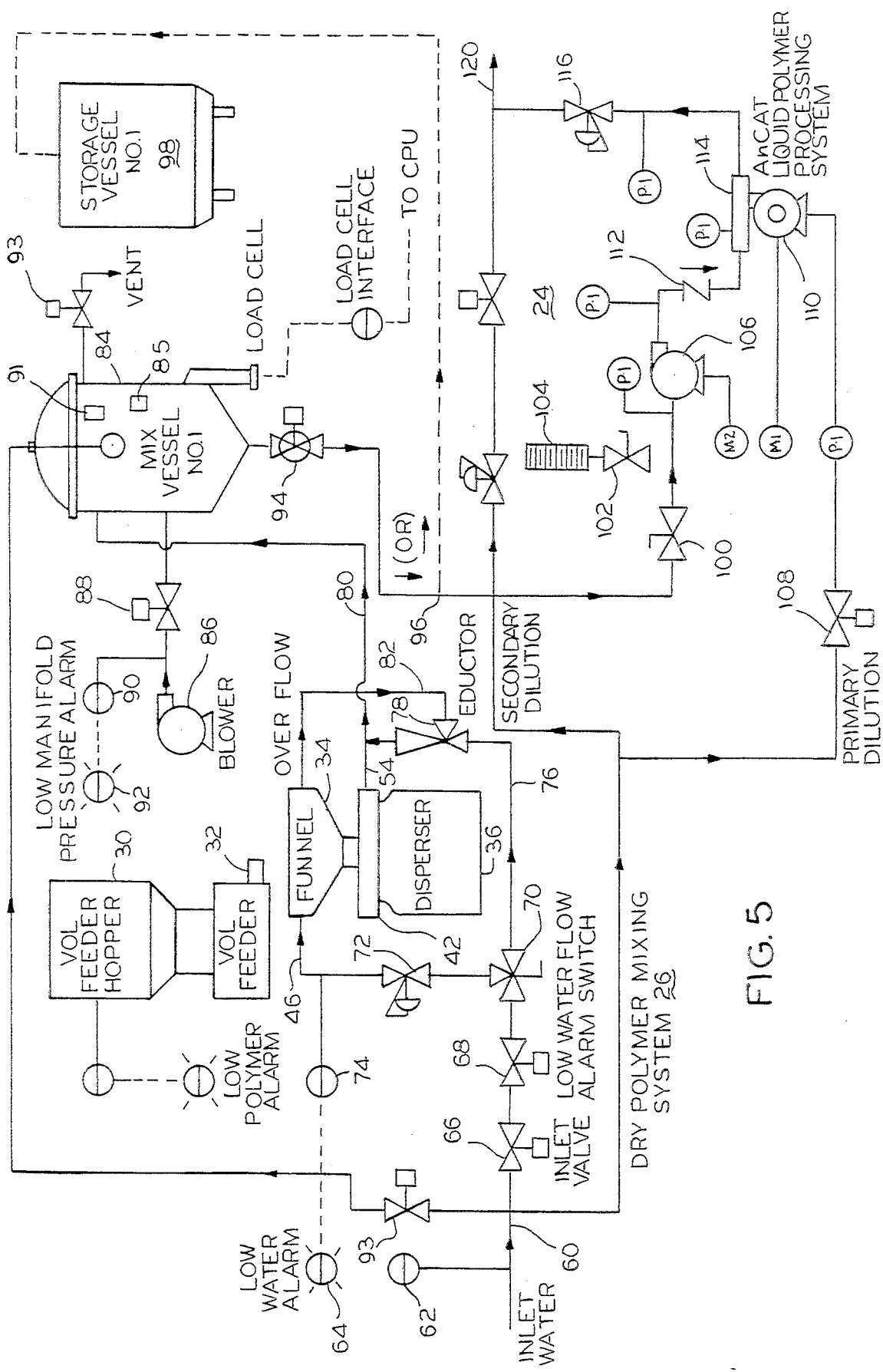

The symbols shown in the lower area of FIG. 5 and designated as circles including the letter "M" are motors. The symbols including the letters "PI" are gages.

An input pump 106 delivers the polymer solution through a check valve 112 to a mixing loop 114. The input primary dilution water is delivered through valve 108 to the pump 110 and the mixing loop 114. As explained in my co-pending patent application, the pressure regulator 116 causes a sudden and abrupt drop of pressure at the output of the mixing loop 114, thus conditioning the polymer.

The system operates this way. The dry polymer is metered from hopper 30 and into the funnel 34. The water flows through an inlet valve 66 and line 46 to the funnel 34. The dry polymer and water meet and mix in funnel 34 from which they are transferred to the pump 42 where energy is added rapidly, thus wetting the polymer particles. The high energy imparted by the pump transfers the dispersed mixture through the hydraulic transfer line 80 to the mixing vessel 84 where the mixture is agitated (air blended) by a use of a low pressure, high volume blower 86. The polymer particles incoming into the vessel 84 are thoroughly wetted, but are essentially still internally dry. Therefore, they are left in vessel 84 to age and soak up water. Because the essentially dry polymer particles and water are coming in mixed vessel 84, an air blower 86 pumps a high volume of low pressure air into mixed vessel number 84. Something very desirable happens to the polymer when it is mixed with air. The polymer becomes what is known as "structured". That is, at a water/air interface between the bubbles and the liquid, the viscosity of the solution increases and gives a higher quality of product as compared, to the quality of a product produced by, say, a purely mechanical mixing means.

When the polymer is thoroughly soaked, the mixture (now a polymer solution) is transferred either to an in line polymer processing system 24 or through an output pipe to any suitable device 98.

EXAMPLE

A Pilot Test Unit (FIG. 6) was set up in a laboratory and operated with the following results:

The laboratory test unit included a centrifugal pump with a 4.8" impeller coupled to a polypropylene funnel having a suitable means for adding water, a variable frequency drive, assorted pressure gauges, a centrifugal air blower, a 150 gallon polyethylene tank, high capacity solenoid valves, and an eductor.

The test equipment is further identified, as follows:

| Reference Number | Component | Manufacturer | |
|---|---|---|---|
| 130 | 2HP Centrifugal Pump | Worthington | D-520 |
| 132 | Funnel | US Plastics | 2" Throat |
| 134 | Eductor | Penberthy | LH 1½" |
| 136 | Tank | Nalgene | 150 gal. |
| 138 | Blower | Spencer | 3HP |
| 140 | Solenoid Valves | ASCO | 8215C83/8215B80 |
| 142 | Variable Speed Drive | Burton | 3HP 460V/3ϕ |

Figure 6:
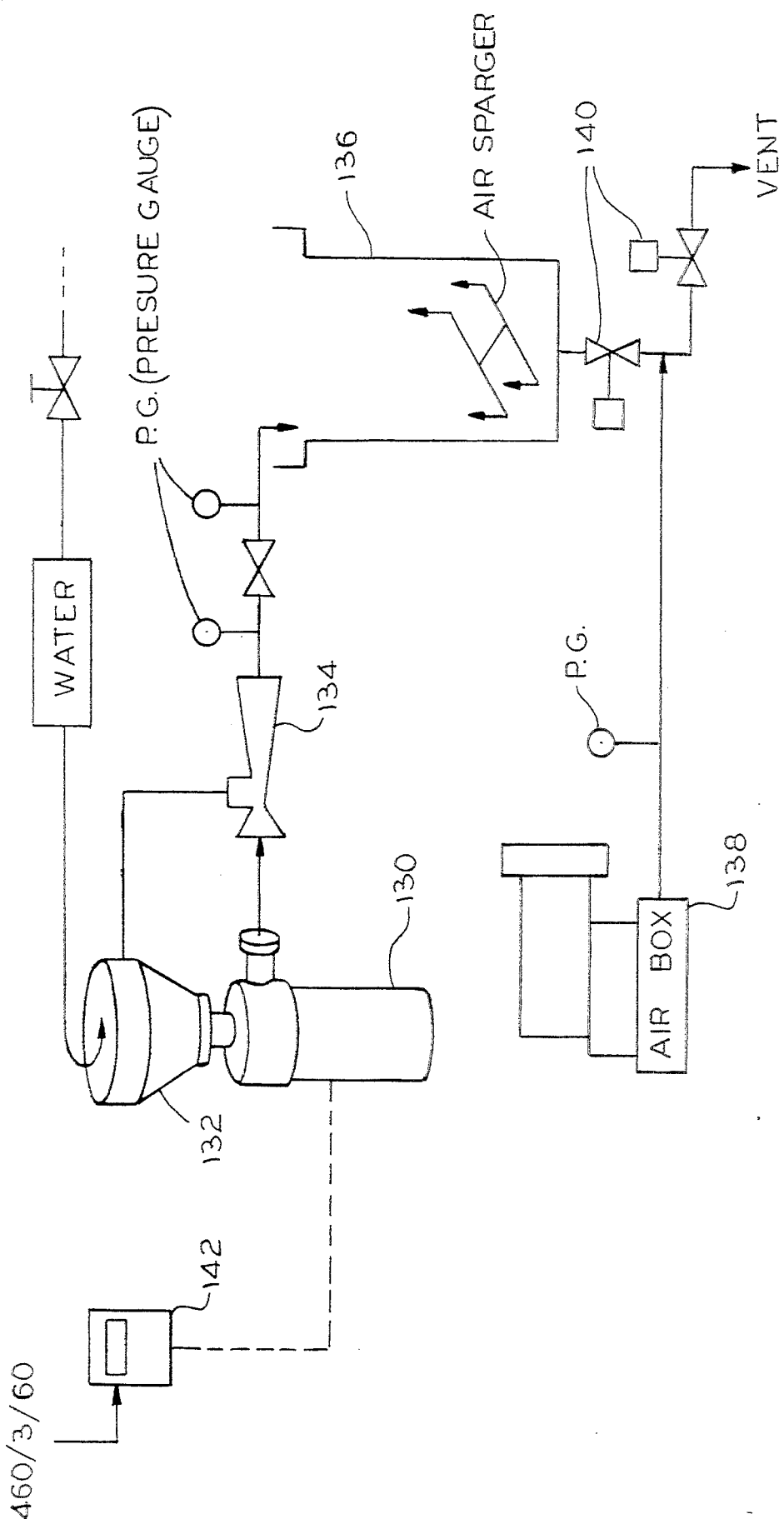

Preparation of Polymer Solution—4,000 grams of Drewfloc 260 low charge, high molecular weight, anionic polymer was added to 30 gallons of water and mixed for 1 hour and 15 minutes using the Pilot Test Unit of FIG. 6 as described in the foregoing specification.

Test No. 1

The water flowrate through the disperser was 6 gpm. The impeller speed, measured with a photo optic tachometer, was 6100 rpm ±300 rpm.

The resulting solution concentration was calculated to be 3.5% by weight. After 1 hour and 15 minutes of mixing, a 600 cc sample was taken and measured for apparent viscosity. A Brookfield viscometer (Model LV) using a No. 4 spindle @ 0.3 rpm resulted in a scale reading of 53 which factors to 1,060,000 cps. The sample was left without further agitation and remeasured approximately 30 minutes later. The viscosity had increased to just over 1,130,000 cps.

A laboratory control sample was prepared using 21 grams of Drewfloc 260 added to a beaker with 600 ccs of water. The sample was mixed with a lab agitator @ 400 rpm for 10 minutes then reduced to 100 rpm for 50 minutes. The resulting solution viscosity using a No. 4 spindle @ 0.6 rpm was calculated to be 640,000 cps. Another test of the viscosity (no further agitation) was run 30 minutes later and was found to increase to 725,000 cps.

Test No. 2

Using an American Cyanamid Magnifloc 866 anionic polymer the test was the same as test No. 1, using the pilot test unit of FIG. 6 except that the solution concentration was changed to 2% by weight. (2270 grams of AmCy 866A added to 30 gallons of water.) The solution was mixed for 1 hour and 15 minutes. A 600 cc sample was tested for apparent viscosity using a Brookfield LV with a No. 4 spindle @ 0.6 rpm. The scale reading of 87.0 factored into 870,000 cps.

A laboratory control sample prepared in the same fashion as test No. 1 using 12 grams of AmCy 866A was added to 600 ccs of water and mixed for 60 minutes. The resulting viscosity using a No. 4 spindle @ 0.6 rpm was calculated to be 490,000 cps.

In each of these test cases, the higher viscosity readings of the polymer solution processed in the Pilot Test Unit of FIG. 6 reflects a beneficial structuring of the polymer molecule at the air/water interface of the air entrained mixture. There is no doubt that the low shear air agitation was also a factor in maximizing the solution viscosities.

Those who are skilled in the art will readily perceive how to modify the invention. Therefore, the appended claims are to be construed to cover all equivalent structures which fall within the true scope and spirit of the invention.

The claimed invention is:

1. A process for conditioning dry polymer by forming therefrom a structured aqueous polymer solution, said method comprising the steps of:

centrifugally dispersing and mixing dry polymer particles in an electrolyte liquid by means of a centrifugal impeller pump having at least 0.25 inch of clearance between the tips of said impeller and an enclosing pump housing wall, said impeller having no stator between the tips and said pump housing wall, said centrifugal dispersion and mixing being at a rate which thoroughly wets said dry polymer with said electrolyte while precluding any substantial reduction in size of said polymer particles, said impeller entraining air bubbles into said dispersion and mixture of polymer and electrolyte, transferring said dispersion and mixture including said entrained air bubbles to an air mixing and holding means for aging during a holding period, blending air into said dispersion while in said mixing and holding means, said blending being at a low air pressure and high air volume to create a substantial number of bubbles in addition to said entrained air bubbles, all of said bubbles traveling upwardly through said dispersion and mixture while in said mixing and holding means, aging said dispersion until said polymer hydrates and forms more of said substantial number of bubbles in said dispersion, and transferring the hydrated aqueous polymer and electrolyte dispersion and mixture including said bubbles in said dispersion from said aging step to an outlet for further processing to activate polymer solution.

2. The process of claim 1 and sensing in said mixing vessel for continuously measuring the solution activity within said mixing vessel, and operating a microprocessor means for adjusting said system in response to said sensing step.

3. The process of claim 1 wherein said sensoring step continuously measures the viscosity of said mixture within said mixing vessels.

4. The process of claim 1 wherein said centrifugal dispersion step comprises the added steps of circumferentially swirling water down and wetting a funnel shaped wall, dispensing dry polymer onto said funnel wall, and disposing the mixture of wetted dry polymer and electrolyte into a vortex of an impeller pump for thoroughly mixing said electrolyte and dry polymer.

5. The process of claim 1 wherein said centrifugal dispersion step comprises the added steps of circumferentially swirling the electrolyte down a funnel shaped wall, said swirling electrolyte leaving a substantially dry vortex at the center of said swirl, dispensing dry polymer into said dry vortex and separately disposing the water and dry polymer into an eye of an impeller pump for thoroughly mixing said electrolyte and dry polymer in said impeller.

6. The process of claim 1 and the further step of hydraulically transferring wetted polymer from said centrifugal dispersion step to said air blending step in response to an output of a pump for causing said centrifugal dispersion.

7. The process of claim 1 and the added step of transferring said centrifugal dispersion to said holding and mixing vessel, and said air blending step comprises the further step of blowing gas into said mixing vessel at said low pressure and high volume to create a relatively large amount of bubbles in said dispersion 8. The process of claim 1 wherein said centrifugal dispersion step comprises the added steps of circumferentially swirling water down a funnel shaped wall, providing means for withdrawing an overflow of said swirling water from said funnel wall, and disposing air into said electrolyte when there is no overflow.

9. The process of any one of the claims 1–8 and the further step of sensing system operations at a plurality of said steps in said process and the added step of signalling alarm conditions responsive to said sensing step at any of said signalling alarm conditions.

10. A method of preparing dry polymer to form a liquid solution suitable for further processing of said polymer, said method comprising the steps of:

dispensing high-solids, high-molecular-weight dry polymer in water, forwarding said dispersion of dry polymer and water to a centrifugal dispenser operating in a range extending from 900 rpm as a lower limit to a speed below the point of particle size reduction which fractures the polymer particles as a higher limit whereby particle sizes are not generally reduced, hydraulically transferring said mixture of dry polymer and water to an air blending chamber, air blending said mixture to make bubbles in said mixture and to promote hydration of polymer molecules, said air blending being carried out at a high volume and low pressure of air, for conformationally activating the polymer at the water/air interface, said low pressure being low enough to prevent any substantial shearing of said polymer in said solution, continuing said air blending step until there is a complete hydration of said polymer particles, and pneumatically transferring the resulting air blended aqueous polymer solution for in line delivery to a further processing system.

11. The method of claim 10 wherein said pneumatic transfer to a further processing system extends to a system for processing liquid polymer solutions.

12. The method of claim 10 wherein said pneumatic transfer to a further processing system comprises an in line delivery system extends to containers for preparing said hydrated polymer solution for further transportation.

13. The method of claim 10 and sensing the dispensing of said dry polymer with an infrared sensor means and a fiber optic scanner positioned adjacent a path followed by said dry polymer.

* * * * *